(12) United States Patent
Nkansah et al.

(10) Patent No.: US 6,344,503 B1
(45) Date of Patent: Feb. 5, 2002

(54) METHOD FOR PREPARING LOW VOC POLYESTER-ACRYLIC GRAFT RESIN COMPOSITIONS

(75) Inventors: Asare Nkansah, Naperville; Catherine T. McKee, Geneva; Ajaykumar Desai, Plainfield; Maria Curry-Nkansah, Naperville, all of IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/408,140

(22) Filed: Sep. 29, 1999

(51) Int. Cl.$^7$ .............................................. C08L 67/00
(52) U.S. Cl. ..................................................... 523/500
(58) Field of Search ......................................... 523/500

(56) References Cited

U.S. PATENT DOCUMENTS

| | | | | |
|---|---|---|---|---|
| 4,252,704 A | | 2/1981 | Falk ....................... | 260/29.2 E |
| 4,398,003 A | | 8/1983 | Irwin ......................... | 525/531 |
| 4,477,525 A | * | 10/1984 | Login ......................... | 428/395 |
| 4,927,875 A | | 5/1990 | Maska et al. ................ | 524/457 |
| 5,156,651 A | * | 10/1992 | Girardeau .................... | 8/115.6 |
| 5,283,296 A | * | 2/1994 | Canivenc .................... | 525/445 |
| 5,464,885 A | | 11/1995 | Craun ........................ | 523/423 |
| 5,516,834 A | * | 5/1996 | Mori ........................... | 524/504 |

* cited by examiner

*Primary Examiner*—Paul R. Michl
(74) *Attorney, Agent, or Firm*—James R. Henes

(57) ABSTRACT

A method is disclosed for the preparation of a water-based graft copolymer of a carboxyl functional polyester and an ethylenically unsaturated monomer having a low level of volatile organic compounds.

11 Claims, No Drawings

METHOD FOR PREPARING LOW VOC POLYESTER-ACRYLIC GRAFT RESIN COMPOSITIONS

BACKGROUND OF THE INVENTION

1. Field of the Invention

The present invention relates to a method for preparing low VOC, water-based polyester-acrylic graft emulsion copolymer resin compositions.

2. Discussion of the Prior Art

Protective surface coatings are organic compositions applied to substrates to form continuous films which are cured or otherwise hardened to provide protection as well as a decorative appearance for the substrate. Protective surface coatings ordinarily comprise an organic polymeric binder, pigments, inert fillers and other additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate.

Increasingly stringent policies and regulations for the protection of the environment have increased the need for protective coatings having very low contents of volatile organic components, that is, having very low VOCs ("volatile organic contents"). For example, polyester-acrylic graft copolymeric binders are utilized in coating compositions of various types. Since the polyester-acrylic-graft copolymeric resinous material, typically employed as the binder in such compositions, often makes up a substantial part of the composition as a whole, the volatile organic solvent content of the resin utilized as the binder is quite important with respect to achieving a low VOC for the composition as a whole.

However, it has been difficult to achieve low VOC in water-borne systems employing solution polymerized acrylic resins, for example, in systems employing a combination of acrylic and polyester resins. The removal of organic solvents from resinous compositions containing solution polymerized acrylic copolymers in attempting to achieve a low VOC generally is accompanied by the significant drawback of causing the viscosity of the resin compositions to increase to an undesirable extent and may even result in gelation.

Craun, U.S. Pat. No. 5,464,885, which issued on Nov. 7, 1995, discloses that high quality aqueous dispersed epoxy coatings can be produced with no organic solvent by esterifying a low molecular weight epoxy resin with low molecular weight carboxyl functional polyester to produce a carboxyl functional low molecular weight epoxy-ester, mixing the epoxy ester with ethylenic monomers and dispersing the mixture in water, and then copolymerizing the ethylenically unsaturated monomers to produce an emulsion polymer useful as a polymeric binder. The aqueous emulsion dispersions of the epoxy-ester addition copolymer are prepared and maintained dispersed in water by ammonia neutralization of the epoxy-ester carboxyl groups without the use of surfactants or any volatile organic solvents. Copolymerization of the ethylenic monomers produces a stable small particle size polymeric dispersion.

Maska, et al., U.S. Pat. No. 4,927,875, which issued on May 22, 1990, discloses an aqueous composition of a water-borne resin comprising a polyester polymer and a solution polymerized acrylic copolymer which has been at least partially neutralized by a base. The water-borne resin comprises: (I) from 10 to 50 percent by weight of a polyester polymer, and (II) from 90 to 50 percent by weight of a solution polymerized acrylic copolymer. The aqueous composition has an organic solvent content of less than or equal to 15 percent by weight and a viscosity at 25 degrees Celsius (° C.) of less than or equal to 5,000 centipoise when the total solids content of the aqueous composition is greater than or equal to 40 percent by weight. The aqueous composition disclosed is prepared by a method which comprises: (A) addition polymerizing in solution (i.e., solution polymerizing in an organic medium) a first monomer composition containing from 1 percent to 15 percent by weight of an epoxy-functional vinyl monomer and from 99 percent to 85 percent by weight of at least one other copolymerizable vinyl monomer in the presence of a polyester polymer having an acid value on solids of from 10 to 85 milligrams KOH/gram (mg KOH/g) and a weight average molecular weight of from 500 to 2,000 until the epoxy functionality of the epoxy-functional vinyl monomer has been essentially completely reacted, to form a first product (1), and thereafter, (B) addition polymerizing in the aforesaid first product (1), a second monomer composition containing from 3 to 50 percent by weight, based on the total weight of vinyl monomers from parts (A) and (B), of an ethylenically unsaturated carboxylic acid and at least one other copolymerizable vinyl monomer different from the epoxy-functional vinyl monomer, to form a second product (2), and thereafter, (C) dispersing the aforesaid product (2) in water utilizing a basic neutralizing agent.

Falk, U.S. Pat. No. 4,252,704, which issued on Feb. 24, 1981, discloses graft polymers that are prepared by graft polymerizing one or more vinyl monomers in the presence of a suitably cross-linked, aliphatic polyester elastomer and that are high impact thermoplastic resins possessing a useful balance of physical properties. The vinyl monomers that are suitable for the purposes of preparing the disclosed graft polymers include vinyl aromatic monomers and acrylic monomers. The cross-linked polyester elastomers that are suitable for the purposes of this invention are linear, high molecular weight, aliphatic, polyester rubbers which have been converted to a latex, and then cross-linked. The latex may be employed in blending directly, or coagulated to form free-flowing rubber particles. The elastomeric polyesters may be described as copolymers of aliphatic dicarboxylic acids and glycols wherein from about 0 to about 20% of the glycol and/or the dicarboxylic acid is ethylenically unsaturated. In preparing the cross-linked polyester latex, the polyester is first dissolved in a suitable organic solvent. The organic solvent must be immiscible with water, and be sufficiently volatile to be readily stripped from an aqueous emulsion. An emulsion of the polyester is then prepared by mixing the solution of polyester with approximately an equal volume of water containing a surfactant. The solvent is then stripped from the emulsion by heating the mixture and distilling the solvent. The resulting solvent-free latex comprises finely dispersed, uncross-linked polyester in aqueous emulsion. Cross-linking of the polyester in latex form is accomplished by adding a suitable peroxide catalyst such as benzoyl peroxide, lauryl peroxide or the like, and heating the mixture to effect decomposition of the peroxide and cross-linking of the polyester. The graft polymer is prepared by polymerizing the vinyl monomer in the presence of the cross-linked, polyester elastomer substrate. The polymerization may be accomplished by a variety of conventional graft polymerization techniques including latex and suspension processes. The resulting graft polymer composition will comprise from 90 to 30 wt. % of the superstrate vinyl monomer component polymerized in the presence of from 10 to 70 wt. % of the substrate cross-linked, polyester elastomer.

OBJECTS OF THE INVENTION

It is therefore a general object of the present invention to provide an improved process for producing polyester-acrylic graft copolymers which overcomes the aforesaid problems of prior art methods.

More particularly, it is an object of the present invention to provide an improved aforesaid process that affords the production of polyester-acrylic graft copolymers having low VOCs.

It is a related object of the present invention to provide an improved aforesaid process that involves production of the graft copolymer by emulsion polymerization in water.

Other objects and advantages will become apparent upon reading the following detailed description and appended claims.

SUMMARY OF THE INVENTION

The objects are achieved by the process of the present invention for producing a water-based graft copolymer of a carboxyl functional polyester and an acrylic monomer comprising: (a) reacting at least one carboxyl group of the polyester having an acid number of less than about 200 with a bridging agent that is capable of forming a bridging group between a carboxyl group of the polyester and an ethylenically unsaturated monomer; (b) forming with the aid of a surfactant an emulsion of the product of step (a) and a copolymerizable ethylenically unsaturated monomer; and (c) polymerizing the aforesaid copolymerizable ethylenically unsaturated monomer with the bridging group of the product of step (a) in the water emulsion of step (b) to form the aforesaid graft copolymer emulsion.

DETAILED DESCRIPTION OF THE PREFERRED EMBODIMENTS

The method of the present invention results in the production of an aqueous emulsion of a graft acrylic polyester copolymer, and comprises (a) reacting an acid group of an acid functional polyester with a bridging agent that is capable of forming a bridging group between an acid group of the polyester and the ethylenically unsaturated monomer; (b) forming an aqueous emulsion of the product of step (a) and the ethylenically unsaturated monomer; and (c) copolymerizing the product of step (a) and the ethylenically unsaturated monomer in the emulsion of step (b) to form the product of the method of the present invention.

A suitable polyester polymer for use in step (a) of the method of the present invention has an acid number in the range of from about 10, preferably from about 20, to about 200, preferably to about 40, and a weight average molecular weight in the range of from about 300, preferably from about 700, to about 4000, preferably to about 1200. Examples of polyester polymers that are suitable for use in step (a) of the method of the present invention include saturated polyester polymers, unsaturated polyester polymers, and alkyd polymers. Saturated polyester polymers are preferred. Polyester polymers can be prepared by well known techniques by reacting organic polyols, preferably diols, (optionally in combination with monohydric alcohols) with polycarboxylic acids, preferably dicarboxylic acids.

Examples of organic polyols that are suitable for preparation of the aforesaid polyester polymer include, but are not limited to, ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexenediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; polycaprolactone diol such as the reaction product of epsilon-caprolactone and ethylene glycol; hydroxyalkylated bisphenols; polyether glycols such as poly(oxytetramethylene)glycol; dimethyl hydantoin diols; isocyanuric acid triols; as well as higher molecular weight polyols such as those produced by oxyalkylating lower molecular weight polyols. Examples of the optional monohydric alcohols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Examples of polycarboxylic acids that are suitable for preparation of the aforesaid polyester polymer include: phthalic acid; isophthalic acid; terephthalic acid; trimellitic acid; tetrahydrophthalic acid, hexahydrophthalic acid; tetrachlorophthalic acid; decanoic acid; dodecanoic acid; adipic acid, azealic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be used and are encompassed by the term "polycarboxylic acid". In addition, certain materials which react in a manner similar to acids to form polyester polymers are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid, benzoic acid, stearic acid, hydroxystearic acid and oleic acid, often is used in the preparation of the aforesaid polyester polymer. Also, lower alkyl esters of the acids such as dimethyl glutarate and dimethyl terephthalate can be used.

Epoxy-functional vinyl monomers are suitable for use as bridging agents for use in step (a) of the method of the present invention. Examples of such epoxy-functional vinyl monomers include: glycidyl acrylate, glycidyl methacrylate, allyl glycidyl ether, methallyl glycidyl ether and glycidyl esters of polymerizable polycarboxylic acids such as maleic acid, fumaric acid, and crotonic acid. Preferred are the epoxy-functional acrylates such as glycidyl acrylate, epoxy-functional methacrylates such as glycidyl methacrylate, or mixtures thereof. Glycidyl methacrylate is particularly preferred.

The reaction of step (a) is carried out until the epoxy functionality of the bridging agent is essentially completely (or completely) reacted, to form the product of step (a), which has an acid number that is substantially lower than the acid number of the polyester polymer reactant. Preferably the acid number of the product of step (a) is in the range of from about 5 to about 30 less than the acid number of the polyester polymer reactant. Step (a) is performed at a temperature in the range of from about 35° C., preferably from about 75° C., to about 110° C., preferably to about 95° C.

Ethylenically unsaturated monomers that are suitable for use in step (b) of the method of the present invention include the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate and isobornyl methacrylate; hydroxyalkyl acrylates and methacrylates such as hydroxyethyl acrylate, hydroxypropyl acrylate, hydroxyethyl methacrylate and hydroxypropyl methacrylate; N-alkoxymethyl acrylamides and methacrylamides such as N-butoxymethyl acrylamide, N-butoxymethyl methacrylamide, N-ethoxymethyl acrylamide and N-ethoxymethyl methacrylamide; epoxy functional ethylenically unsaturated monomers such as glycidyl methacrylate and glycidyl acrylate, and unsaturated nitriles, such as acrylonitrile, methacrylonitrile and ethacrylonitrile. Other ethylenically unsaturated monomers (vinyl monomers) which can be used in addition to the acrylic monomers include: vinyl aromatic hydrocarbons (optionally substituted, for example, by halo atoms) such as styrene, alpha-methyl styrene, alpha-chloromethyl styrene and vinyl toluene; and vinyl aliphatic hydrocarbons (optionally substituted, for example, by halo atoms) such as vinyl acetate and vinyl chloride.

A surfactant is employed in step (b) to facilitate formation of the emulsion. Suitable surfactants include alkyl salts of various hydrocarbon sulfates and sulfonates such as sodium lauryl sulfate, sodium dodecylbenzene sulfonate, alkyl phenoxypolyethoxyethanols having alkyl groups of seven to twelve carbon atoms such as heptylphenoxypolyethoxyethanols, octylphenoxypolyethoxyethanols, methoxyoctylphenoxypolyethoxyethanols, nonylphenoxypolyethoxyethanols, and dodecylphenoxypolyethoxyethanols.

The product of step (a) and the ethylenically unsaturated monomer are employed in step (b) in proportions such that the product of step (b) comprises from about 10 to about 60 weight percent of product of step (a) and from about 40 to about 90 weight percent of the ethylenically unsaturated monomer. The amount of water employed in step (b) is in the range of from about 15, preferably from about 20, to about 50, preferably to about 35 parts per 100 parts by weight of the product of step (a). Step (b) is performed at a temperature in the range of from about 12° C., preferably from about 20° C., to about 32° C., preferably to about 26° C. The amount of surfactant employed in step (b) is in the range of from about 0.3, preferably from about 1.0, to about 6.0, preferably to about 2.0, parts by weight per 100 parts of the product of step (a).

Step (c) is carried out at a temperature in the range of from about 50° C., preferably from about 80° C., to about 95° C., preferably to about 85° C.

The following examples will serve to illustrate certain specific embodiments of the invention disclosed herein. These examples are for illustrative purposes only and should not be construed as limiting the scope of the novel invention disclosed herein as there are many alternative modifications and variations which will be apparent to those skilled in the art and which fall within the spirit and scope of the disclosed invention.

EXAMPLE 1

Preparation of vinyl-functional polyester polymer (Sample 1)

Vinyl functional polyester polymer was prepared as followed: In a 4 necked reaction vessel equipped with a stirrer, reflux condenser, and thermocouple was charged 1500 grams of acid polyester with acid number 41 and 60 grams of glycidyl methacrylate and 2.6 grams of methyl imidazole. The mixture is heated to 80° C. and monitored till acid number was reduced from 41 to 22. The mixture was cooled to room temperature and stored.

EXAMPLE 2

Preparation of waterbased polyester/acrylic graft emulsion polymer (Sample 2)

In a four-necked vessel equipped with stirrer, reflux condenser, thermocouple, dropping funnel and nitrogen inlet was charged with 439.4 grams of deionized water and 3.9 grams of Polystep B-11 (surfactant available from Stepan). The vessel was heated to 85° C. When the temperature was attained, 56 grams of mixture A, 3.9 grams of ammonium persulfate in 22.3 grams of water and 3.9 grams of sodium carbonate and 22.3 grams of water were charged to the reactor. Mixture A was an emulsion of acrylic monomers and vinyl-polyester.

Mixture A Consists of:

| | |
|---|---|
| Deionized water | 266.3 grams |
| Polystep B-11 | 13.3 grams |
| Vinyl Polyester (Sample 1) | 133.1 grams |
| Methyl methacrylate | 199.4 grams |
| Butyl Acrylate | 182.9 grams |
| Hydroxy Ethyl Methacrylate | 73.2 grams |
| Methacrylic Acid | 25.3 grams |
| n-dodecylthiol | 2.3 grams |

After 10 mins at 85° C., the rest of mixture A was slowly added over 1 hour to the reactor. Thereafter, the reaction was held at that temperature for two hours. The temperature was then reduced to 52° C. and 8.5 grams of ammonia was added. The reaction was cooled to room temperature and emulsion polymer filtered.

EXAMPLE 3

Preparation of Waterbased Polyester (Sample 3)

In a four-necked vessel equipped with stirrer, reflux condenser, thermocouple, dropping funnel and nitrogen inlet was charged with 765 grams of Isophthalic Acid, 393 grams of 1,6-hexanediol, 311 grams of neopentyl glycol and 29 grams of trimethylol propanediol. Under inert conditions, the mixture was heated to 230° C. Continue to heat to acid number 41. The reaction was cooled to 170° C. and 342 grams of diethyleneglycol monobutyl ether was added; at 100° C., a mixture of 60 grams of dimethyl ethanolamine and 1500 grams of water was added slowly with vigorous stirring over 10 minutes. The reaction was then allowed to cool to room temperature.

EXAMPLE 4

Preparation of Waterbased Acrylic Emulsion Polymer (Sample 4)

In a four-necked vessel equipped with stirrer, reflux condenser, thermocouple, dropping funnel and nitrogen inlet was charged with 150.14 grams of deionized water and 2.5 grams of Polystep B-11 (surfactant available from Stepan). The vessel was heated to 85° C. When the temperature was attained, 10 grams of mixture A, 1.5 grams of ammonium persulfate in 7.5 grams of water and 1.5 grams of sodium carbonate and 7.5 grams of water were charged to the reactor. Mixture A was an emulsion of acrylic monomers.

Mixture A Consists of:

| | |
|---|---|
| Deionized water | 72.8 grams |
| Polystep B-11 | 4.0 grams |
| Methyl methacrylate | 73.0 grams |
| Butyl Acrylate | 68.3 grams |
| Hydroxy Ethyl Methacrylate | 29.9 grams |
| Methacrylic Acid | 4.6 grams |
| n-dodecylthiol | 0.88 grams |

After 10 mins at 85° C., the rest of mixture A was slowly added over 1 hour to the reactor. Thereafter, the reaction was held at that temperature for two hours. The temperature was then reduced to 52° C. and 1.7 grams of ammonia is added. The reaction was cooled to room temperature and emulsion polymer filtered.

EXAMPLE 5

Preparation of Aqueous Polyester/Acrylic Blend Emulsion Polymer (Sample 5)

In a four-necked vessel equipped with stirrer, reflux condenser, thermocouple, dropping funnel and nitrogen inlet was charged with 150.8 grams of deionized water and 2.7 grams of Polystep B-11 (surfactant available from Stepan). The vessel was heated to 85° C. When the temperature is attained, 10 grams of mixture A, 1.5 grams of ammonium persulfate in 7.5 grams of water and 1.5 grams of sodium carbonate and 7.5 grams of water were charged to the reactor. Mixture A was an emulsion of acrylic monomers and polyester (Sample 3).

Mixture A Consists of:

| | |
|---|---|
| Deionized water | 73.2 grams |
| Polystep B-11 | 4.53 grams |
| Methyl methacrylate | 58.8 grams |
| Acid polyester (Sample 3) | 35.7 grams |
| Butyl Acrylate | 54.6 grams |
| Hydroxy Ethyl Methacrylate | 24.3 grams |
| Methacrylic Acid | 3.86 grams |
| n-dodecylthiol | 0.71 grams |

After 10 mins at 85° C., the rest of mixture A was slowly added over 1 hour to the reactor. Thereafter, the reaction was held at that temperature for two hours. The temperature was then reduced to 52° C. and 1.5 grams of ammonia was added. The reaction was cooled to room temperature and emulsion polymer filtered.

EXAMPLE 6

Measurements of Application Properties of Polyester/Acrylic Grafted Resins

In the following example, graft polyester/acrylic polymer samples of the invention (Sample 2) are compared with blend polyester/acrylic sample (Sample 5), all-acrylic sample (Sample 4) and all-acrylic sample (Sample 3). Also included in the comparison is a high performance Commercial Sample. The samples were formulated in coatings formulations. Each sample coating was tested and the results of the testing are shown in Table 1.

TABLE 1

| | SAMPLE | | | | |
|---|---|---|---|---|---|
| | Sample 2 | Sample 3 | Sample 4 | Sample 5 | Commercial Sample |
| Pencil Hardness | B | <5B | HB | 5B | HB |
| Impact Resistance (in-lb) | 320 | >320 | 260 | 300 | 260 |
| Dry Time/mins (Dry To Touch) | 36 | 92 | 35 | 62 | 53 |

The results of this testing demonstrate that coating compositions of the present invention result in films having increased hardness (over polyester and blended system), better flexibility (than the blend and all acrylic systems) and improved dry time over the blend and all-polyester system.

From the above, it is apparent that the objects of the present invention have been achieved. While only certain modifications have been set forth, alternative embodiments and various modifications will be apparent from the above description to those skilled in the art. These and other alternatives are considered equivalents and are within the spirit and scope of the present invention.

Having described the invention, what is claimed is:

1. A process for producing a water-based graft copolymer of a carboxyl functional polyester and an ethylenically unsaturated monomer comprising:

(a) reacting at least one carboxyl group of the polyester having an acid number of less than about 200 with an epoxy-functional vinyl monomer which functions as a bridging agent as that is capable of forming a bridging group between a carboxyl group of the polyester and a copolymerizable ethylenically unsaturated monomer;

(b) forming with the aid of a surfactant an emulsion in water of the product of step (a) and a copolymerizable ethylenically unsaturated monomer which is different from the aforesaid bridging agent; and (c) reacting the aforesaid copolymerizable ethylenically unsaturated monomer with the bridging group of the product of step (a) and polymerizing the resulting product in the water emulsion of step (b) to form the aforesaid graft copolymer.

2. The process of claim 1 wherein the polyester is a polyester derived from aromatic or aliphatic diacids or anhydrides.

3. The process of claim 1 wherein the polyester is a polyester derived from aliphatic diols.

4. The process of claim 1 wherein the acid number of the polyester is from about 10 to about 180.

5. The process of claim 4 wherein the acid number is in the range of from about 20 to about 120.

6. The process of claim 1 wherein the vinyl monomer employed in step (b) is acrylic acid, methacrytic acid, an acrylate ester or a methacrylate ester.

7. The process of claim 1 wherein the bridging agent is glycidyl acrylate, glycidyl methacrylate, alkyl glycidyl ether, or methalkyl glycidyl ether.

8. The process of claim 1 wherein the acid number of the product of step (a) is substantially lower than the acid number of the polyester.

9. The process of claim 1 wherein the mole ratio of polyester to bridging agent is in the range of from about 10 to about 100.

10. The process of claim 1 wherein the ethylenically unsaturated monomer employed in step (b) is an alkyl acrylate, an alkyl methacrylate, a hydroxyalkyl acrylate or methacrylate, or an N-alkoxymethyl acrylamide or methacrylamide.

11. The process of claim 1 wherein the mole ratio of polyester to bridging agent is in the range of from about 1 to about 10.

* * * * *